US012146341B2

(12) United States Patent
Chuang et al.

(10) Patent No.: US 12,146,341 B2
(45) Date of Patent: Nov. 19, 2024

(54) ELECTRONIC LOCK DEVICE AND OPERATION METHOD OF THE SAME

(71) Applicant: TONG LUNG METAL INDUSTRY CO., LTD., Chiayi County (TW)

(72) Inventors: Pai-Hsiang Chuang, New Taipei (TW); Yu Lin, Chiayi (TW); Chun-Yi Fang, Yunlin County (TW); Ding-Sian Cai, Chiayi County (TW); Chen-Ming Lin, Chiayi County (TW); Ruei-Jie Jeng, Chiayi County (TW)

(73) Assignee: TONG LUNG METAL INDUSTRY CO., LTD., Minxiong Township (TW)

( * ) Notice: Subject to any disclaimer, the term of this patent is extended or adjusted under 35 U.S.C. 154(b) by 198 days.

(21) Appl. No.: 17/933,397

(22) Filed: Sep. 19, 2022

(65) Prior Publication Data

US 2023/0228120 A1 Jul. 20, 2023

(30) Foreign Application Priority Data

Jan. 20, 2022 (TW) ................................. 111102353

(51) Int. Cl.
*E05B 45/06* (2006.01)
*E05B 47/00* (2006.01)

(52) U.S. Cl.
CPC .......... *E05B 45/06* (2013.01); *E05B 47/0001* (2013.01); *E05B 2047/005* (2013.01)

(58) Field of Classification Search
CPC ................. E05B 47/00; E05B 47/0012; E05B 2047/002; E05B 2047/0024; E05B 2047/0069; E05B 2047/0036; E05B 2047/0092; E05B 47/026; E05B 63/04; E05B 63/044; Y10T 70/5212; Y10T 70/7062; Y10T 70/7113; Y10T 70/7915; Y10T 70/8838; G01B 7/003; G01D 5/12
(Continued)

(56) References Cited

U.S. PATENT DOCUMENTS 5,878,530 A * 3/1999 Eccleston ............... E05F 15/63
49/340
6,891,479 B1 * 5/2005 Eccleston ............... E05F 15/63
340/545.1
(Continued)

FOREIGN PATENT DOCUMENTS

CN 109167549 A * 1/2019 ......... E05B 47/0001
CN 109403730 A * 3/2019 ......... E05B 17/0045
(Continued)

*Primary Examiner* — Suzanne L Barrett
(74) *Attorney, Agent, or Firm* — Michael Best & Friedrich LLP

(57) ABSTRACT

An electronic lock device includes a lock mechanism, an actuation mechanism that actuates the lock mechanism, and a control unit including a processor and a current detection module. During an operation in which the actuation mechanism is activated to start switching the lock mechanism from an original state to an intended state, the current detection module continuously detects an amount of electric current flowing through the actuation mechanism. When the amount of electric current is greater than a predetermined threshold, the processor controls the actuation mechanism to switch the lock mechanism back to the original state, and deactivates the actuation mechanism.

10 Claims, 6 Drawing Sheets

(58) Field of Classification Search
USPC ........................ 70/432, 275, 277, 279.1, 280
See application file for complete search history.

(56) References Cited

U.S. PATENT DOCUMENTS

| | | | | |
|---|---|---|---|---|
| 2016/0343181 | A1* | 11/2016 | Cheng | G07C 9/00309 |
| 2018/0080250 | A1* | 3/2018 | Martin | E05B 15/10 |
| 2018/0298640 | A1* | 10/2018 | Caterino | E05B 15/02 |
| 2019/0003207 | A1* | 1/2019 | Wu | E05B 47/026 |

FOREIGN PATENT DOCUMENTS

| | | | | |
|---|---|---|---|---|
| CN | 111691768 | A * | 9/2020 | E05B 15/00 |
| KR | 20010033856 | A * | 4/2001 | E05B 13/00 |

* cited by examiner

ELECTRONIC LOCK DEVICE AND OPERATION METHOD OF THE SAME

CROSS-REFERENCE TO RELATED APPLICATION

This application claims priority to Taiwanese Patent Application No. 111102353, filed on Jan. 20, 2022.

FIELD

The disclosure relates to a lock device, and more particularly to an electronic lock device and an operation method of the electronic lock device.

BACKGROUND

Nowadays, electronic lock devices for door security have become increasingly popular due to the comparatively simple operations and high security. The electronic lock devices may be controlled by a user to automatically switch between a locked state (in which a deadbolt is controlled to extend out) and an unlocked state (in which a deadbolt is controlled to retract) by, for example, inputting a password, scanning a fingerprint, operating an electronic device (e.g., a smartphone) to connect with the electronic lock devices, etc.

For a conventional electronic lock device, during the operation in which the conventional electronic lock device is switching from one of the locked state and the unlocked state to the other, in adverse conditions where a switching mechanism of the conventional electronic lock device is lammed or foreign objects are present and prevent the deadbolt from moving, a microprocessor may continue to control the switching mechanism to move the deadbolt, without being "aware" of such conditions. As a result, undesired consequences such as malfunctioning, damages to components, etc., may occur.

SUMMARY

Therefore, an object of the disclosure is to provide an electronic lock device that is configured to stop operation when an adverse condition that impedes the operations of electronic lock device is detected, so as to prevent the potential undesired consequences from happening.

According to the one embodiment of the disclosure, the electronic lock device includes a lock mechanism that is controllable to switch between a locked state and an unlocked state, an actuation mechanism that is connected to the lock mechanism and that is configured to actuate the lock mechanism to switch between the locked state and the unlocked state; and a control unit that is connected to the actuation mechanism, and that includes a processor, and a current detection module for detecting an amount of electric current flowing through the actuation mechanism.

In use, during an operation in which the actuation mechanism is activated by the processor to start switching the lock mechanism from an original state, which is one of the locked state and the unlocked state, to an intended state, which is the other one of the locked state and the unlocked state, the current detection module is configured to continuously detect the amount of electric current flowing through the actuation mechanism.

In response to receipt of the amount of electric current, the processor is configured to determine whether the amount of electric current is greater than a predetermined threshold.

When it is determined that the amount of electric current is greater than the predetermined threshold, the processor is configured to control the actuation mechanism to switch the lock mechanism back to the original state, and to deactivate the actuation mechanism.

Another object of the disclosure is to provide a method to operate the above-mentioned electronic lock device.

According to the one embodiment of the disclosure, the electronic lock device includes a lock mechanism, an actuation mechanism configured to actuate the lock mechanism to switch between a locked state and an unlocked state, and a control unit that includes a processor and a current detecting module. The method is implemented using the processor of the control unit and includes:

during an operation in which the actuation mechanism is activated by the processor to start switching the lock mechanism from an original state, which is one of the locked state and the unlocked state, to an intended state, which is the other one of the locked state and the unlocked state, controlling the current detection module to continuously detect an amount of electric current flowing through the actuation mechanism;

in response to receipt of the amount of electric current, determining whether the amount of electric current is greater than a predetermined threshold; and when it is determined that the amount of electric current is greater than the predetermined threshold, controlling the actuation mechanism to switch the lock mechanism back to the original state, and then deactivating the actuation mechanism.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
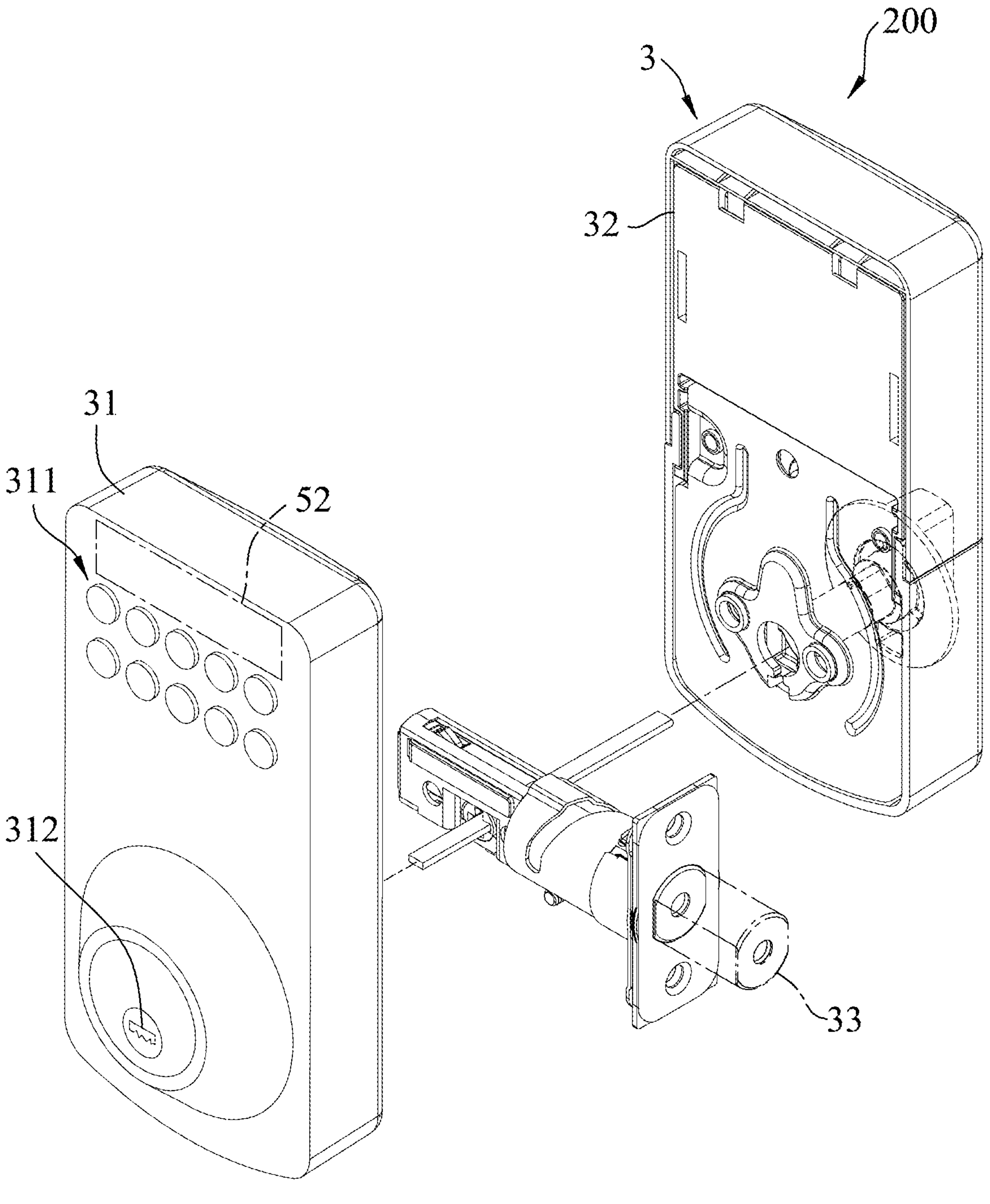
FIG. 1 is a perspective view illustrating an electronic lock device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/ devices/equipment via another one or more apparatus/devices/equipment, or wireless communication.

FIG. 1 is a perspective view illustrating an electronic lock device 200 according to one embodiment of the disclosure. Referring to FIGS. 1 to 4, the electronic lock device 200 is adapted to be mounted to a door (not depicted in the drawings), and includes a lock mechanism 3, an actuation mechanism 4 connected to the lock mechanism 3, and a control unit 5 connected to the actuation mechanism 4.

The lock mechanism 3 includes a first housing part 31, a second housing part 32 and a deadbolt 33. The first housing part 31 and the second housing part 32 cooperatively constitute a housing of the electronic lock device 200. In this embodiment, the first housing part 31 is to be mounted on an outer surface of the door facing outside of a room to which the door serves as an entrance, and the second housing part 32 is to be mounted on an inner surface of the door facing inside of the room. In embodiments, the door may be a left-handed door or a right-handed door. In this embodiment, the first housing part 31 may include a control panel 311 with a keypad for enabling interaction with a user, and a keyhole 312 for enabling a key to be inserted therein. The second housing part 32 may include a knob 321 for allowing manual driving to move the deadbolt 33.

The lock mechanism 3 is operable to switch between an unlocked state, in which the deadbolt 33 is retracted into the door, and a locked state, in which the deadbolt 33 is extended out of a side (a left side or a right side) of the door. The broken lines in FIG. 1 illustrate the deadbolt 33 being extended in the locked state. In such a state, the deadbolt 33 engages a hole in a jamb of the door when the door is closed, and therefore the door cannot be opened when the lock mechanism 3 is in the locked state. On the other hand, in the unlocked state, the deadbolt 33 is retracted inside the door (and therefore disengages the hole in the jamb), and the door can be opened.

It is noted that not all components of the lock mechanism 3 are depicted in the drawings as the operations of those components are readily known in the related art. Additionally, structures of the lock mechanism 3 other than what is shown in FIG. 1 may also be implemented in other embodiments without deviating from the scope of the disclosure.

Figure 2:
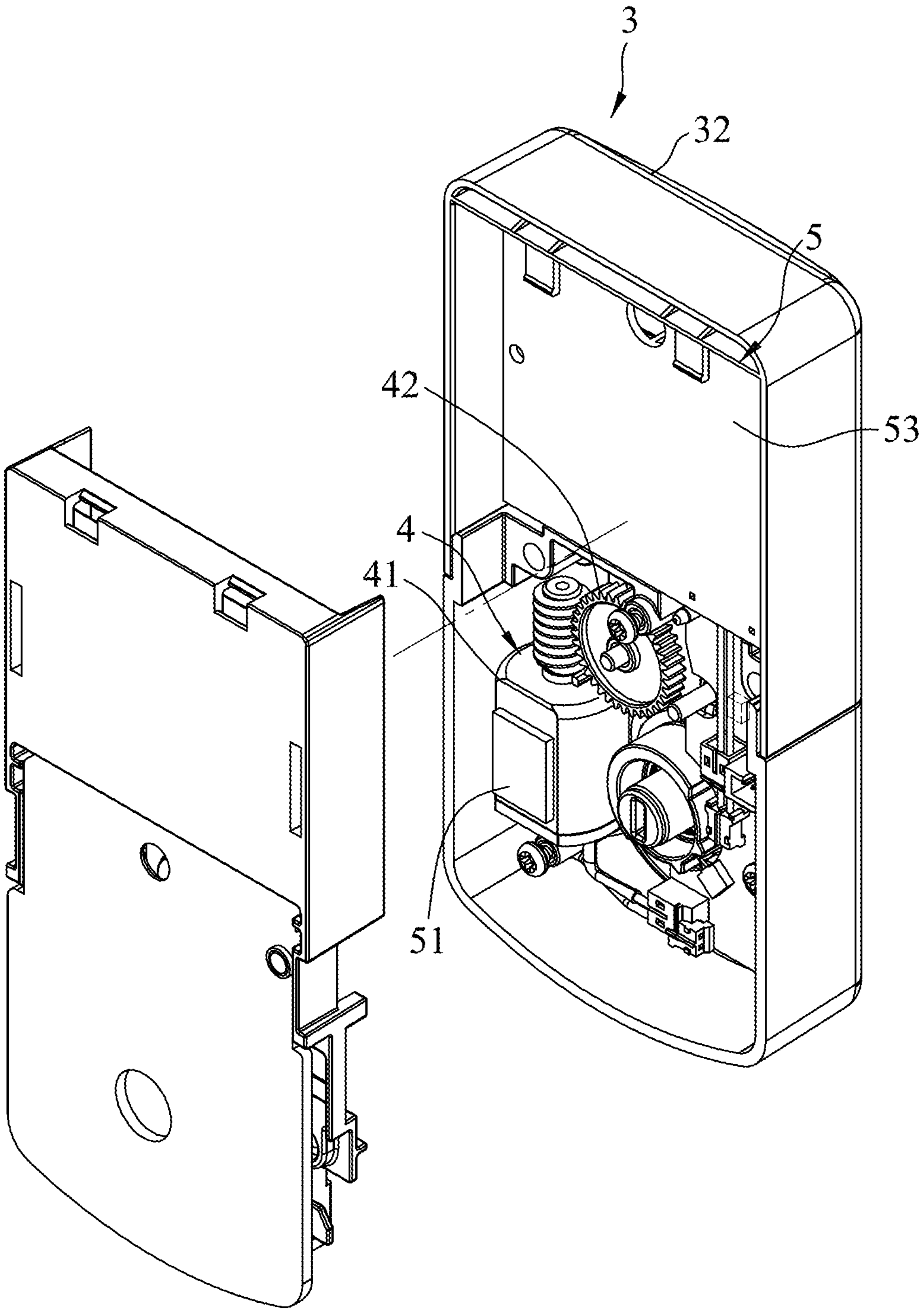
FIG. 2 is a partially exploded perspective view of a housing part and an actuation mechanism of the electronic lock device according to one embodiment of the disclosure.

FIG. 2 is a partially exploded view of the second housing part 32 and the actuation mechanism 4 of the electronic lock device 200 according to one embodiment of the disclosure. In this embodiment, the actuation mechanism 4 includes a motor 41, and a transmission structure 42 including a gear set connected between the motor 41 and the second housing part 32. In use, the motor 41 may be controlled to move the transmission structure 42 which in turn actuates the components of the second housing part 32 to move the deadbolt 33. As such, the actuation mechanism 4 may be activated to actuate the lock mechanism 3 to switch between the locked state and the unlocked state. The lock mechanism 3 may include additional components disposed within the first housing part 31 and/or the second housing part 32 and configured to be driven by the actuation mechanism 4 to actuate the deadbolt 33 to move between the corresponding positions.

It is noted that the operations between the actuation mechanism 4 and the lock mechanism 3 are readily known in the related art, and the details thereof are omitted herein for the sake of brevity. Additionally, structures of the actuation mechanism 4 other than what is shown in FIG. 2 may also be implemented in other embodiments without departing from the scope of the disclosure.

Figure 3:
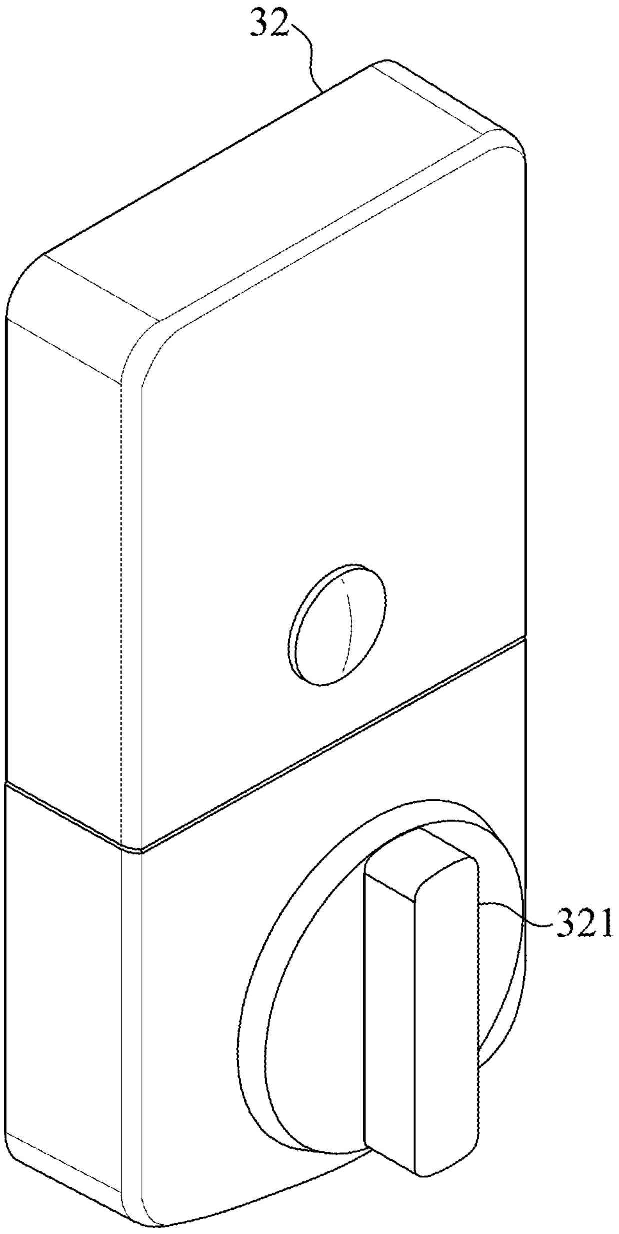
FIG. 3 is a perspective view of the housing part of the electronic lock device according to one embodiment of the disclosure.
Figure 4:
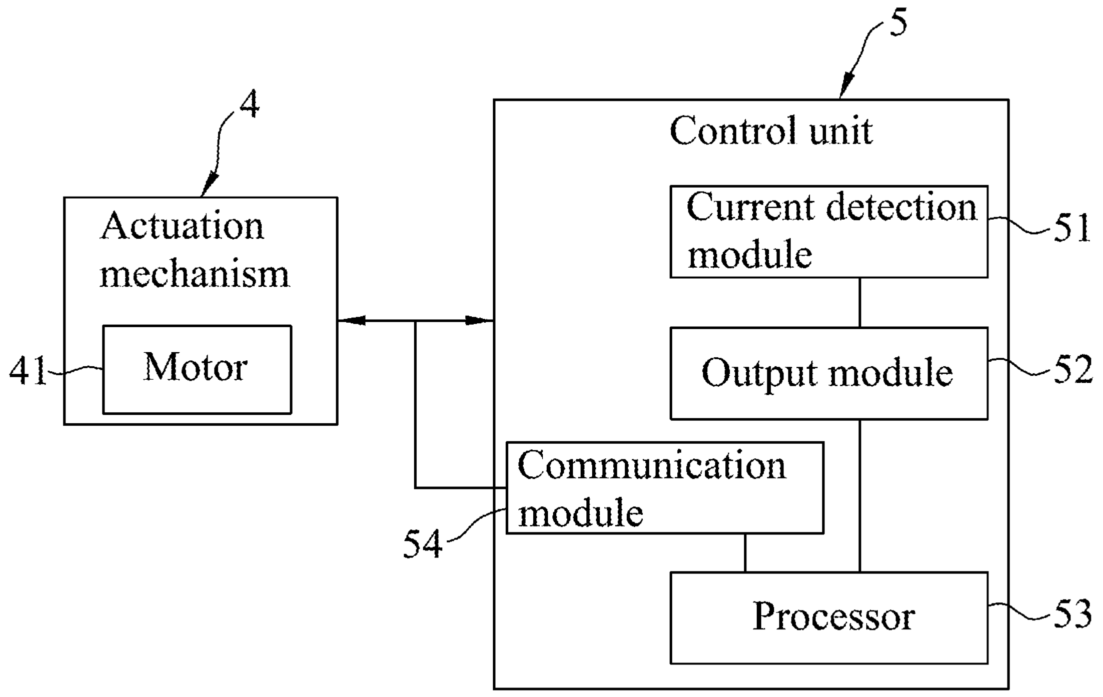
FIG. 4 is a block diagram illustrating part of the actuation mechanism and a control unit of the electronic lock device.

FIG. 3 is a perspective view of the second housing part 32 according to one embodiment of the disclosure. FIG. 4 is a block diagram illustrating connections among components of the actuation mechanism 4 and the control unit 5.

Specifically, in this embodiment, the control unit 5 includes a current detection module 51, an output module 52, a processor 53 and a communication module 54.

The current detection module 51 is connected to the motor 41 to detect an amount of electric current flowing through the motor 41. In embodiments, the current detection module 51 may be embodied using an Ampere meter (Ammeter).

The output module 52 is controllable to generate and output an alert. In this embodiment, the output module 52 includes a display section disposed on a surface of the first housing part 31 (see FIG. 1, illustrating the display section disposed above the control panel 311). In some embodiments, the output module 52 may further include a speaker and a display device.

The processor 53 is connected to the current detection module 51, the output module 52, and the communication module 54.

The processor 53 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The communication module 54 may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

In use, the processor 53 may execute a software program to implement the operations as described below.

In the case that the door having the electronic lock device 200 mounted thereon is closed and the lock mechanism 3 is in the locked state, when a user intends to access the room, he/she may operate the electronic lock device 200 by, for example, inputting a password, scanning a fingerprint, operating an electronic device (e.g., a smartphone, a tablet, a smart watch, a pair of smart glasses, etc.) to connect with the electronic lock device 200 via the communication module 54 for inputting a password or a fingerprint, etc. In response, when it is determined that the password is correct or the fingerprint is authentic, the processor 53 may generate a signal to control the actuation mechanism 4 to switch the lock mechanism 3 from the locked state to the unlocked state (i.e., actuating the deadbolt 33 to retract). It is noted that the operations of verification of the password or authentication of the fingerprint for unlocking the electronic lock device 200 are well known in the related art, and details thereof are omitted herein for the sake of brevity.

During the operation in which the actuation mechanism 4 is activated by the processor 53 to switch the lock mechanism 3 to the unlocked state, the current detection module 51 is configured to continuously detect an amount of electric current flowing through the motor 41, and to continuously transmit the amount of electric current to the processor 53. In response to receipt of the amount of electric current, the processor 53 is configured to determine whether the amount of electric current is greater than a predetermined threshold that is considered as an upper limit of a predefined normal current range in which the motor 41 is deemed to be functioning normally. It is noted that, in this embodiment, the predetermined threshold is about 0.75 to 0.8 A, but in other embodiments where different motors are employed, other values may be used as the predetermined threshold. When it is determined that the amount of electric current is greater than the predetermined threshold, the processor 53 is configured to initiate a checkup procedure.

In the checkup procedure, the processor 53 is configured to first generate a signal to control the actuation mechanism 4 to switch the lock mechanism 3 back to the locked state. Then, the processor 53 is configured to generate a signal to control the actuation mechanism 4 to switch the lock mechanism 3 to the unlocked state, and determine whether a present amount of the electric current presently received from the current detection module 51 is greater than the predetermined threshold. When it is determined that the present amount of electric current is still greater than the predetermined threshold, it may be deduced that the lock mechanism 3 is currently unable to be normally switched from the locked state to the unlocked state. This may result from adverse conditions such as the components of the actuation mechanism 4 being damaged or broken, foreign objects being present and prevent the deadbolt 33 from moving, etc.

With the presence of the adverse condition(s), the operation of switching the lock mechanism 3 to the unlocked state is to be aborted, so as to prevent the potential adverse effects of the components of the electronic lock device 200 becoming damaged and the electronic lock device 200 malfunctioning. At this stage, the processor 53 is configured to generate a signal to control the actuation mechanism 4 to switch the lock mechanism 3 back to the locked state, and control the output module 52 to generate and output an alert. In this embodiment, the alert outputted by the output module 52 may include flashes one or more of the LEDs, an audible sound, a text message, etc. In some embodiments, the output module 52 may further transmit the alert to the electronic device for the electronic device to output the alert.

On the other hand, when it is determined that the amount of electric current becomes smaller than the predetermined threshold, it may be deduced that the lock mechanism 3 is now able to be normally switched from the locked state to the unlocked state, and the processor 53 may terminate the checkup procedure, and generate a signal to control the actuation mechanism 4 to switch the lock mechanism 3 to the unlocked state.

It is noted that in some embodiments, the checkup procedure may be reiterated for a number of times to provide a more accurate determination relating to the operations of the actuation mechanism 4 and the lock mechanism 3. That is to say, when it is determined that the amount of electric current is still greater than the predetermined threshold, the processor 53 may reiterate the checkup procedure by generating a signal to control the actuation mechanism 4 to switch the lock mechanism 3 back to the locked state, and then generating a signal in an attempt to once again control the actuation mechanism 4 to switch the lock mechanism 3 to the unlocked state. Then, the processor 53 determines whether the amount of electric current newly received from the current detection module 51 is greater than the predetermined threshold.

In embodiments, the checkup procedure may be performed a number (N) of times. In embodiments, the number N is an integer greater than 1. In such cases, when it is determined that the amount of electric current received during each of the number (N) of times of the checkup procedure is greater than the predetermined threshold, the processor 53 is configured to generate a signal to control the actuation mechanism 4 to switch the lock mechanism 3 back to the locked state, and control the output module 52 to generate and output an alert.

It should be noted that, in embodiments, the above operations may also be implemented in the cases where the actuation mechanism 4 is switching the lock mechanism 3 from the unlocked state to the locked state (e.g., the cases in which the door is just closed, and the processor 53 generates a signal to control the actuation mechanism 4 to automatically switch the lock mechanism 3 to the locked state, so as to "lock the door"). When it is determined that the amount of electric current is greater than the predetermined threshold while the lock mechanism 3 is being switched from the unlocked state to the locked state, the processor 53 is configured to initiate the checkup procedure, in which the processor 53 first generates a signal to control the actuation mechanism 4 to switch the lock mechanism 3 back to the unlocked state, rather than the locked state. That is to say, the above operations may be implemented when the actuation mechanism 4 is switching the lock mechanism 3 from one of the locked state and the unlocked state to the other one of the locked state and the unlocked state.

Generally, in the checkup procedure, the processor 53 generates a signal to control the actuation mechanism 4 to first switch back to the one of the locked state and the unlocked state, and to then switch to the other one of the locked state and the unlocked state. When it is determined that the amount of electric current received during each of the number (N) of times of the checkup procedure is greater than the predetermined threshold, the processor 53 is configured to generate a signal to control the actuation mechanism 4 to switch the lock mechanism 3 back to the one of the locked state and the unlocked state, to deactivate the actuation mechanism 4 afterwards, and to control the output module 52 to generate and output the alert.

Figure 5:
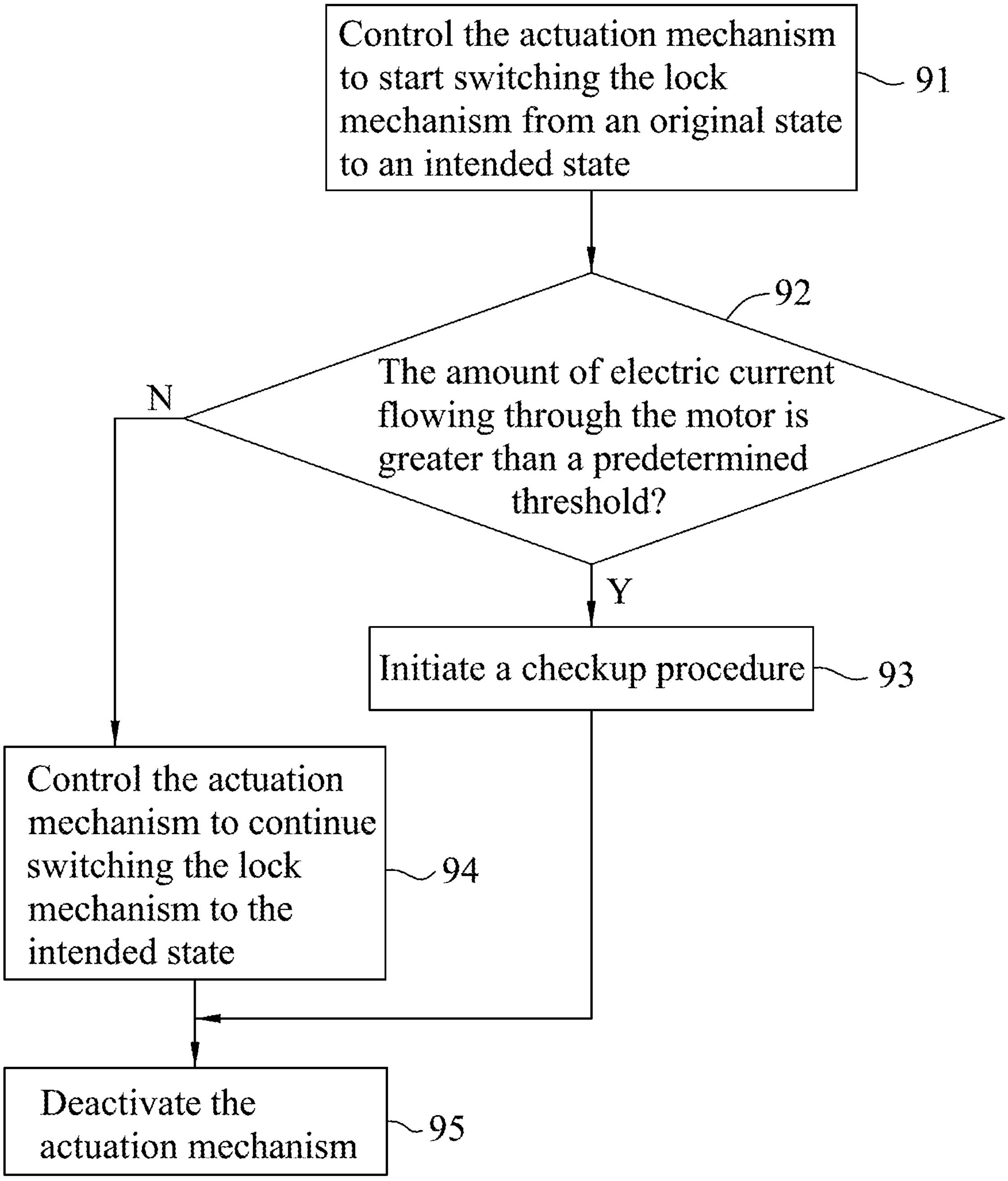
FIG. 5 is a flow chart illustrating steps of an operation method of the electronic lock device according to one embodiment of the disclosure.

The above operations may be implemented as an operation method of the electronic lock device 200 for protecting the components of the electronic lock device 200. Specifically, FIG. 5 is a flow chart illustrating steps of an operation method of the electronic lock device 200 for protecting the components thereof according to one embodiment of the disclosure. In this embodiment, the method may be implemented by the processor 53 that executes a software program.

In step 91, the processor 53 generates a signal to control the actuation mechanism 4 to start switching the lock mechanism 3 from one of the locked state and the unlocked state (hereinafter referred to an original state) to the other one of the locked state and the unlocked state (hereinafter referred to an intended state). This step may be initiated when the user interacts with the electronic lock device 200 as described above.

In step 92, during switching of the lock mechanism 3 to the intended state, the current detection module 51 continuously detects an amount of electric current flowing through the motor 41, and continuously transmits the amount of electric current to the processor 53. In response to receipt of the amount of electric current, the processor 53 determines whether the amount of electric current is greater than a predetermined threshold.

When it is determined that the amount of electric current is greater than the predetermined threshold, the flow proceeds to step 93, in which the processor 53 initiates a checkup procedure. Otherwise, the flow proceeds to step 94, in which the processor 53 controls the actuation mechanism 4 to continue switching the lock mechanism 3 to the intended state. Then, in step 95, after the lock mechanism 3 has been switched to the intended state, the processor 53 deactivates the actuation mechanism 4 to stop the actuation mechanism 4 from operation (i.e., to not actuate the movement of the deadbolt 33). At this stage, the method is terminated.

Figure 6:
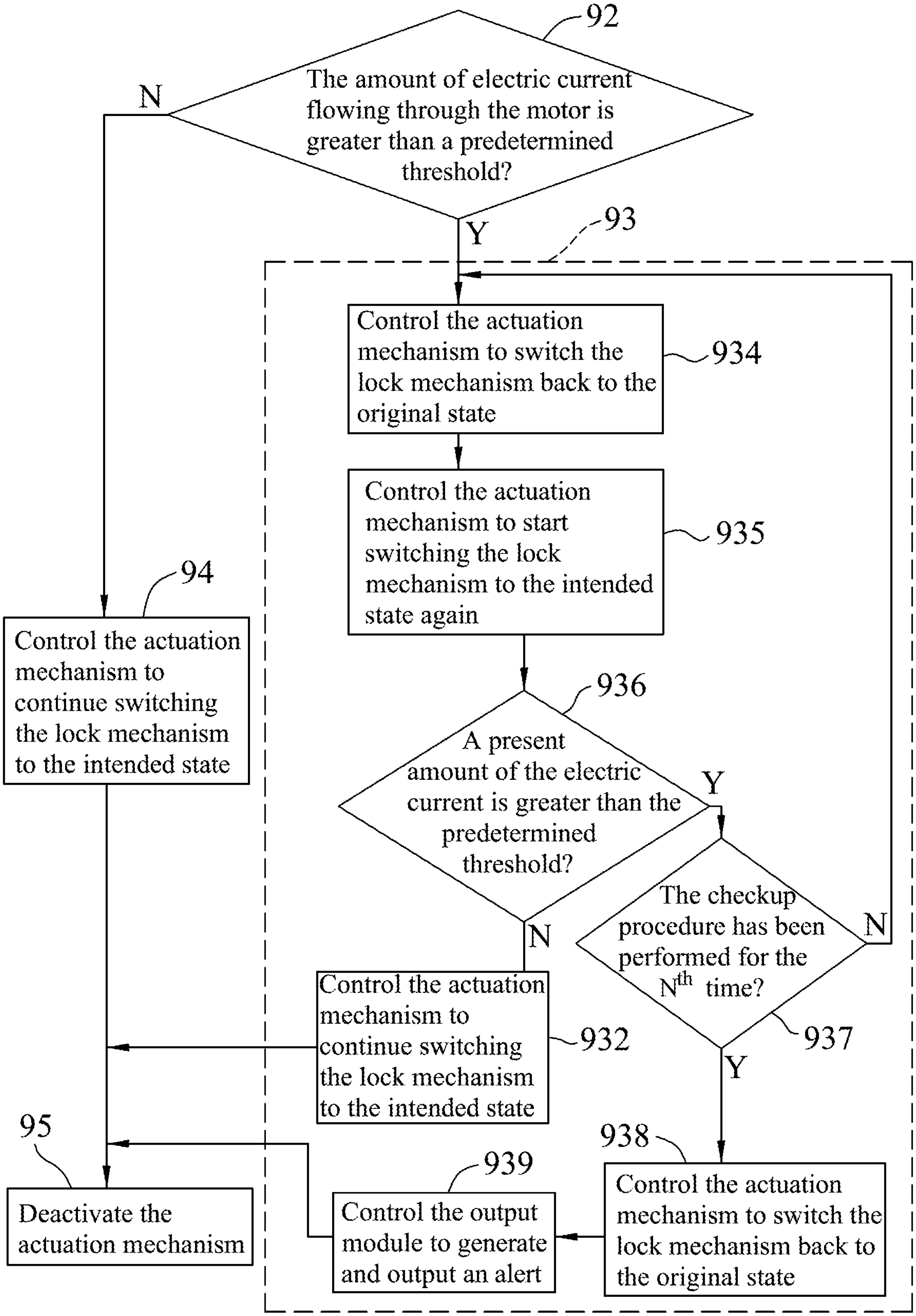
FIG. 6 is a flow chart illustrating sub-steps of a checkup procedure of the operation method according to one embodiment of the disclosure.

FIG. 6 is a flow chart illustrating sub-steps of the checkup procedure of step 93 according to one embodiment of the disclosure.

In sub-step 934, the processor 53 generates a signal to control the actuation mechanism 4 to switch the lock mechanism 3 back to the original state. Then, in sub-step 935, the processor 53 generates a signal to control the actuation mechanism 4 to start switching the lock mechanism 3 to the intended state again, and in sub-step 936, during switching of the lock mechanism 3 to the intended state, the processor 53 determines whether a present amount of the electric current is greater than the predetermined threshold.

When it is determined that the present amount of electric current is still greater than the predetermined threshold, the flow proceeds to sub-step 937, in which the processor 53 determines whether the checkup procedure has been performed for the $N^{th}$ time. In use, the processor 53 may employ a counter circuit to keep a count of the number (n) of times the checkup procedure has been performed.

On the other hand, when it is determined in sub-step 936 that the present amount of electric current becomes smaller than the predetermined threshold, the flow proceeds to sub-step 932, in which the processor 53 controls the actuation mechanism 4 to continue switching the lock mechanism 3 to the intended state. Then, the flow proceeds to step 95, where after the lock mechanism 3 has been switched to the intended state, the processor 53 controls the actuation mechanism 4 to stop operation. At this stage, the method is terminated.

In sub-step 937, when it is determined that the checkup procedure has not yet been performed for the $N^{th}$ time (i.e., when $n<N$), the flow goes back to sub-step 934. Otherwise, when it is determined that the checkup procedure has been performed for the number (N) of times (i.e., when $n=N$), the flow proceeds to sub-step 938, in which the processor 53 generates a signal to control the actuation mechanism 4 to switch the lock mechanism 3 back to the original state. Then, in sub-step 939, the processor 53 controls the output module 52 to generate and output an alert. Afterward, the flow proceeds to step 95, and the method is terminated.

It is noted that in some embodiments, the checkup procedure may be performed only once. In such cases, the determination of sub-step 937 is automatically affirmative, or sub-step 937 may be omitted.

In some embodiments, the checkup procedure may be omitted. In such cases, as soon as it is determined that the amount of electric current is greater than the predetermined threshold, the processor 53 is configured to control the actuation mechanism 4 to switch the lock mechanism 3 back to the original state, and to then deactivate the actuation mechanism 4 and control the output module 52 to generate and output an alert.

To sum up, embodiments of the disclosure provide an electronic lock device and a method for protecting the components of the electronic lock device. The electronic lock device is configured to determine an amount of electric current flowing through a motor of an actuation mechanism while the actuation mechanism is actuating a lock mechanism to switch from an original state (which may be one of a locked state and an unlocked state) to an intended state (which may be the other one of the locked state and the unlocked state). When it is determined that the amount of electric current is greater than a predetermined threshold, the electronic lock device is configured to initiate a checkup procedure. Upon an attempt to switch the lock mechanism to the intended state during the checkup procedure, when it is determined that the amount of electric current received during the checkup procedure is still greater than the predetermined threshold, the electronic lock device is configured to control the lock mechanism to switch back to the original state, to output an alert, and to control the actuation mechanism to stop operating. As such, an owner of the electronic lock device may be notified of a potential adverse condition associated with the electronic lock device that is making the electronic lock device unable to function normally, and may engage in a troubleshooting procedure to resolve the adverse condition. Additionally, with the actuation mechanism being controlled to stop operating, the potential adverse effects of the components of electronic lock device being damaged due to continued operation may be eliminated.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An electronic lock device, comprising:

a lock mechanism that is controllable to switch between a locked state and an unlocked state;

an actuation mechanism that is connected to said lock mechanism and that is configured to actuate said lock mechanism to switch between the locked state and the unlocked state; and a control unit that is connected to said actuation mechanism, and that includes a processor, and a current detection module for detecting an amount of electric current flowing through said actuation mechanism;

wherein:

during an operation in which said actuation mechanism is activated by said processor to start switching said lock mechanism from an original state, which is one of the locked state and the unlocked state, to an intended state, which is the other one of the locked state and the unlocked state, said current detection module is configured to continuously detect the amount of electric current flowing through said actuation mechanism;

in response to receipt of the amount of electric current, said processor is configured to determine whether the amount of electric current is greater than a predetermined threshold; and when it is determined that the amount of electric current is greater than the predetermined threshold, said processor is configured to control said actuation mechanism to immediately switch said lock mechanism back to the original state, and to deactivate said actuation mechanism;

wherein said control unit is further configured to, when it is determined that the amount of electric current is greater than the predetermined threshold, initiate a checkup procedure that includes steps of:

a) controlling said actuation mechanism to switch said lock mechanism back to the original state;

b) controlling said actuation mechanism to start switching said lock mechanism to the intended state again, and receiving a present amount of electric current flowing through said actuation mechanism;

c) determining whether the present amount of electric current is still greater than the predetermined threshold; and d) when it is determined that the present amount of electric current is still greater than the predetermined threshold, controlling said actuation mechanism to switch said lock mechanism back to the original state, and then deactivating said actuation mechanism.

2. The electronic lock device of claim 1, wherein said processor is configured to perform the checkup procedure that further includes:

when it is determined that the present amount of electric current is still greater than the predetermined threshold, repeating steps a) to c);

after repeating steps a) to c) for a pre-determined number of times, when it is determined that the present amount of the electric current is still greater than the predetermined threshold, implementing step d).

3. The electronic lock device of claim 2, wherein, when it is determined that the present amount of electric current is smaller than the predetermined threshold, said processor is configured to control said actuation mechanism to switch said lock mechanism to the intended state, and then to deactivate said actuation mechanism.

4. The electronic lock device of claim 2, wherein:

said control unit further includes an output module that is connected to said processor and that is controllable to generate and output an alert; and said processor is further configured to, in step d), control said output module to generate and output the alert.

5. The electronic lock device of claim 1, wherein:

said control unit further includes an output module that is connected to said processor and that is controllable to generate and output an alert; and when it is determined that the amount of electric current is greater than the predetermined threshold, said processor is further configured to control said output module to generate and output the alert.

6. A method for operating an electronic lock device, the electronic lock device including a lock mechanism, an actuation mechanism configured to actuate the lock mechanism to switch between a locked state and an unlocked state, and a control unit that includes a processor and a current detecting module, the method being implemented using the processor of the control unit and comprising:

during an operation in which the actuation mechanism is activated by the processor to start switching the lock mechanism from an original state, which is one of the locked state and the unlocked state, to an intended state, which is the other one of the locked state and the unlocked state, controlling the current detection module to continuously detect an amount of electric current flowing through the actuation mechanism;

in response to receipt of the amount of electric current, determining whether the amount of electric current is greater than a predetermined threshold; and when it is determined that the amount of electric current is greater than the predetermined threshold, controlling the actuation mechanism to immediately switch the lock mechanism back to the original state, and then deactivating the actuation mechanism;

the method further comprising, when it is determined that the amount of electric current is greater than the predetermined threshold, initiating a checkup procedure that includes steps of:

a) controlling the actuation mechanism to switch the lock mechanism back to the original state;

b) controlling the actuation mechanism to start switching the lock mechanism to the intended state again, and receiving a present amount of electric current flowing through the actuation mechanism;

c) determining whether the present amount of electric current is still greater than the predetermined threshold; and d) when it is determined that the present amount of electric current is still greater than the predetermined threshold, controlling the actuation mechanism to switch the lock mechanism back to the original state, and then deactivating the actuation mechanism.

7. The method of claim 6, wherein the checkup procedure further includes:

when it is determined that the present amount of electric current is still greater than the predetermined threshold, repeating steps a) to c);

after repeating steps a) to c) for a pre-determined number of times, when it is determined that the present amount of electric current is still greater than the predetermined threshold, implementing step d).

8. The method of claim 7, the control unit further including an output module that is connected to the processor and that is controllable to generate and output an alert, wherein step d) of the checkup procedure further includes controlling the output module to generate and output the alert.

9. The method of claim 7, wherein the checkup procedure further includes:

when it is determined that the present amount of electric current is smaller than the predetermined threshold, controlling the actuation mechanism to switch said lock mechanism to the intended state, and then deactivating said actuation mechanism.

10. The method of claim 6, the control unit further including an output module that is connected to the processor and that is controllable to generate and output an alert, the method further comprising:

when it is determined that the amount of electric current is greater than the predetermined threshold, controlling the output module to generate and output the alert.

* * * * *